United States Patent [19]

Kuroki et al.

[11] Patent Number: 4,796,911
[45] Date of Patent: Jan. 10, 1989

[54] AUTOMOTIVE SUSPENSION SYSTEM WITH ROLL-STABILIZER HAVING ROAD CONDITION-DEPENDENT TORSION MODULUS, AND CONTROL OF TORSIONAL MODULES

[75] Inventors: Junsuke Kuroki, Yokohama; Tohru Takahashi; Ken Ito, both of Yokosuka, all of Japan

[73] Assignee: Nissan Motor Company, Ltd., Japan

[21] Appl. No.: 18,821

[22] Filed: Feb. 24, 1987

Related U.S. Application Data

[63] Continuation of Ser. No. 647,648, Sep. 6, 1984, abandoned.

[30] Foreign Application Priority Data

Sep. 9, 1983 [JP] Japan ................. 58-166353

[51] Int. Cl.⁴ .......................................... B60G 21/00
[52] U.S. Cl. ..................................... 280/689; 280/707
[58] Field of Search .............. 280/689, 665, 726, 723, 280/721, 707; 180/169

[56] References Cited

U.S. PATENT DOCUMENTS

| | | |
|---|---|---|
| 2,247,749 | 7/1941 | de Venel . |
| 3,003,783 | 10/1961 | Brueder ................. 280/707 |
| 3,029,089 | 5/1959 | Nashman . |
| 3,321,210 | 5/1967 | Delchev . |
| 3,402,691 | 9/1969 | Ott . |
| 3,603,612 | 9/1971 | Hill . |
| 3,608,925 | 9/1971 | Murphy . |
| 3,677,561 | 7/1972 | McNally . |
| 3,850,027 | 11/1974 | Nakanishi et al. . |
| 3,920,283 | 11/1975 | Strader . |
| 3,945,664 | 3/1976 | Hiruma . |
| 3,992,039 | 11/1976 | Hiruma . |
| 3,995,883 | 12/1976 | Glaze ..................... 280/707 |
| 4,065,154 | 12/1977 | Glaze . |
| 4,100,795 | 7/1978 | Panetti . |
| 4,105,216 | 8/1978 | Graham et al. . |
| 4,152,000 | 5/1979 | Meisel, Jr. . |
| 4,327,936 | 5/1982 | Sekiguchi . |
| 4,333,668 | 6/1982 | Hendrickson et al. . |
| 4,349,077 | 9/1982 | Sekiguchi et al. . |
| 4,363,092 | 12/1982 | Abo et al. . |
| 4,401,310 | 8/1983 | Ishikawa et al. . |
| 4,402,375 | 9/1983 | Glaze ..................... 180/169 |
| 4,433,386 | 2/1984 | Este . |
| 4,436,318 | 3/1984 | Ichikawa et al. . |
| 4,473,319 | 9/1984 | Spangler . |
| 4,483,409 | 11/1984 | Fun . |
| 4,506,751 | 3/1985 | Stephens . |
| 4,506,909 | 3/1985 | Nakashima et al. . |

(List continued on next page.)

FOREIGN PATENT DOCUMENTS

| | | |
|---|---|---|
| 0027869 | 5/1981 | European Pat. Off. . |
| 0080291 | 6/1983 | European Pat. Off. . |
| 0091017 | 10/1983 | European Pat. Off. . |
| 2053649 | 5/1972 | Fed. Rep. of Germany ...... 280/723 |
| 2053649 | 5/1972 | Fed. Rep. of Germany . |
| 2844028 | 4/1980 | Fed. Rep. of Germany ...... 280/689 |
| 2844028 | 4/1980 | Fed. Rep. of Germany . |
| 55-109008 | 7/1955 | Japan . |
| 55-141085 | 10/1955 | Japan . |
| 46-3879 | 2/1971 | Japan . |
| 50-40970 | 4/1975 | Japan . |
| 53-26021 | 3/1978 | Japan . |
| 53-38022 | 4/1978 | Japan . |
| 54-103074 | 8/1979 | Japan . |
| 55-114708 | 8/1980 | Japan . |
| 56-665 | 1/1981 | Japan . |

(List continued on next page.)

OTHER PUBLICATIONS

"A Guide to Dirt Track Suspension" pp. 78–89, *Circle Track* 1982.

(List continued on next page.)

*Primary Examiner*—Ross Weaver
*Attorney, Agent, or Firm*—Leydig, Voit & Mayer

[57] ABSTRACT

An automotive suspension system has a roll stablizer with an adjustable torsion modulus. The torsion modulus of the stabilizer is adjusted depending upon road surface conditions and other parameters. A controller is associated with the stabilizer to adjust its torsion modulus. When the vehicle is moving on a relatively smooth road surface, the torsion modulus of the stabilizer is adjusted toward to a relatively high value. On the other hand, when the vehicle travels along a rough road, the torsion modulus is adjusted toward a lower value.

23 Claims, 13 Drawing Sheets

U.S. PATENT DOCUMENTS

| | | | |
|---|---|---|---|
| 4,515,391 | 5/1985 | Koide | 280/690 |
| 4,526,401 | 7/1985 | Kakizaki et al. | |
| 4,527,676 | 7/1985 | Emura et al. | |
| 4,540,188 | 9/1985 | Meloche et al. | |
| 4,555,126 | 11/1985 | Ishimitsu et al. | |
| 4,568,067 | 2/1986 | Iwata | 267/8 R |
| 4,570,969 | 2/1986 | Tsutsumi et al. | 280/664 |
| 4,572,317 | 2/1986 | Isono et al. | |
| 4,600,215 | 7/1986 | Kuroki et al. | |
| 4,616,848 | 10/1986 | Sugasawa et al. | |
| 4,620,619 | 11/1986 | Emura et al. | 188/319 |
| 4,630,226 | 12/1986 | Tanaka | 364/561 |
| 4,647,069 | 3/1987 | Iijima | 280/707 |
| 4,652,010 | 3/1987 | Sugasawa | 280/707 |
| 4,674,767 | 6/1987 | Kuroki et al. | 280/707 |
| 4,677,595 | 6/1987 | Obayashi et al. | 367/13 |
| 4,677,599 | 6/1987 | Obayashi et al. | 367/99 |
| 4,696,489 | 9/1987 | Fujishiro et al. | 280/707 |
| 4,722,547 | 2/1988 | Kishi et al. | 280/707 |
| 4,733,883 | 3/1988 | Sugasawa | 280/707 |
| 4,739,860 | 4/1988 | Kobayashi et al. | 181/123 |
| 4,741,554 | 5/1988 | Okamoto | 280/703 |

FOREIGN PATENT DOCUMENTS

| | | |
|---|---|---|
| 56-31861 | 3/1981 | Japan . |
| 56-42739 | 4/1981 | Japan . |
| 56-103307 | 8/1981 | Japan . |
| 56-111009 | 8/1981 | Japan . |
| 56-147107 | 11/1981 | Japan . |
| 56-153267 | 11/1981 | Japan . |
| 56-153268 | 11/1981 | Japan . |
| 56-171311 | 12/1981 | Japan . |
| 57-68575 | 4/1982 | Japan . |
| 57-68574 | 4/1982 | Japan . |
| 57-84375 | 5/1982 | Japan . |
| 57-93271 | 6/1982 | Japan . |
| 57-101144 | 6/1982 | Japan . |
| 57-175266 | 10/1982 | Japan . |
| 57-172808 | 10/1982 | Japan . |
| 57-182506 | 11/1982 | Japan . |
| 57-179678 | 11/1982 | Japan . |
| 57-182544 | 11/1982 | Japan . |
| 58-30818 | 2/1983 | Japan . |
| 58-30819 | 2/1983 | Japan . |
| 58-30815 | 2/1983 | Japan . |
| 58-30618 | 2/1983 | Japan . |
| 58-30817 | 2/1983 | Japan . |
| 5330814 | 2/1983 | Japan . |
| 58-30542 | 2/1983 | Japan . |
| 58-30544 | 2/1983 | Japan . |
| 58-66079 | 4/1983 | Japan . |
| 58-93614 | 6/1983 | Japan . |
| 58-180714 | 12/1983 | Japan . |
| 59-6107 | 1/1984 | Japan . |
| 59-18005 | 2/1984 | Japan . |
| 59-50242 | 3/1984 | Japan . |
| 59-37112 | 3/1984 | Japan . |

OTHER PUBLICATIONS

"Optimum Linear Preview Control With Application to Vehicle Suspension", Journal of Dynamic Systems, Measurement and Control, Sep. 1976, pp. 309–315, An Optimal Linear Active Suspension with Finite Road Preview, Society of Automotive Engineers, Inc., Feb. 1980; Some Fundamental Limitations of Active and Passive Vehicle–Suspension Systems, Aeronautic and Space Engineering and Manufacturing Meeting, Oct. 1968.

SAE 680750 "Some Fundamental Limitations of Active & Passive Vehicle Suspension Systems".

"Circle Track" A Guide to Dirt Track Suspension, pp. 78–87 by Eric Rickman.

SAE Technical Paper Series 800520, "An Optimal Linear Active Suspension with Finite Road Preview".

(A) SMOOTH ROAD (Vs = 40km/h)

(B) ROUGH ROAD (Vs = 40km/h)

(A) SMOOTH ROAD (Vs = 60km/h)

(B) ROUGH ROAD (Vs = 60km/h)

AUTOMOTIVE SUSPENSION SYSTEM WITH ROLL-STABILIZER HAVING ROAD CONDITION-DEPENDENT TORSION MODULUS, AND CONTROL OF TORSIONAL MODULES

BACKGROUND OF THE INVENTION

This application is a continuation of application Ser. No. 647,648, filed Sept. 6, 1984, now abandoned.

The present invention relates generally to an automotive suspension system including a roll-stabilizer having a torsion modulus which adjust to changing road conditions. The invention further relates to control of the variable-torsion-modulus-type roll-stabilizer for adjusting the rigidity of the suspension system depending upon road conditions.

In general, a roll-stabilizer comprises a torsion bar which resists torsional forces due to the movement of the vehicle. Relatively high roll-stability enhances drivability for changing lanes and so forth as the vehicle cruises along a smoothly surfaced road. On the other hand, high roll-stability degrades traction or road-holding ability when the vehicle is travelling along rough roads where the road surface is uneven. Such relatively low traction or road-holding ability may adversely affect steering and drivability on rough roads. Furthermore, on rough roads, due to relatively high roll-stability or high rigidity of the stabilizer, the traction of the left- and right-hand wheels tend to differ significantly, causing differential transmission of driving torque which further degrades drivability and/or performance. The differential traction of the wheels may also adversely affect braking or deceleration characteristics, subjecting the vehicle to serious danger.

SUMMARY OF THE INVENTION

The principle object of the present invention is to allow adjustment of the torsion modulus for a roll-stabilizer in a vehicle suspension system.

Another and more specific object of the invention is to provide a combination of a roll-stabilizer with a variable torsional modulus and a control system for controlling the torsion modulus of the stabilizer according to vehicle driving conditions.

A further object of the present invention is to provide a torsion modulus control system which responds to road conditions to which the vehicle is subjected to adjust the torsion modulus appropriately.

In order to accomplish the above-mentioned and other objects and advantages, there is provided, according to the present invention, a roll-stabilizer in a vehicle suspension system, which incorporates means for adjusting its torsion modulus. The torsion modulus adjusting means detects one or more torsion modulus control parameters. Preferably, these torsion modulus control parameters include features of road-surface conditions which affect drivability and riding comfort. In the preferred procedure, the torsion modulus is adjusted to a relatively low range when the vehicle is travelling along a rough road. This ensures riding comfort and good road traction. On the other hand, the torsion modulus is adjusted to a relatively high range when the vehicle is travelling along a smooth road so as to provide good drivability and higher cornering force.

According to the preferred embodiment of the present invention, an automotive vehicle suspension system comprises first means for rotatably supporting a pair of vehicle wheels while pivotably supporting a vehicle body, a roll stabilizer extending perpendicular to the vehicle axis and producing a damping force against rolling moment applied to the first means ("rolling moment" referring to forces which would result in rotation of the vehicle about its longitudinal axis), the stabilizer including a second means for adjusting the torsion modulus of the stabiizer so as to control the damping force or spring to be produced, an actuator responsive to a control signal for operating the second means, a detector adapted to detect a preselected vehicle driving condition-indicative parameter and produce a detector signal indicative thereof, and a controller responsive to the detector signal for deriving a desired value of the torsion modulus and feeding a control signal indicative of the derived value of the torsion modulus to the actuator.

BRIEF DESRIPTION OF THE DRAWINGS

The present invention will be understood more fully from the detailed description given below and from the accompanying drawings of the preferred embodiments of the present invention, which, however, should not be taken to limit the invention to the specific embodiments but are for explanation and understanding only:

Figure 14:
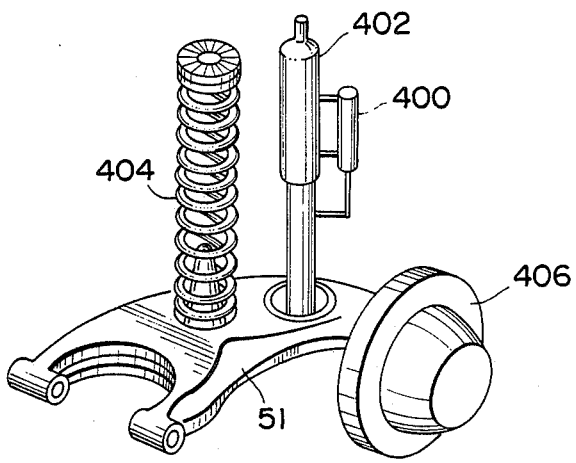
FIG. 14 is a perspective illustration of a stroke potentiometer applied to a shock absorber of the vehicle suspension system, which potentiometer serves as a road surface ranging sensor.
Figure 15:
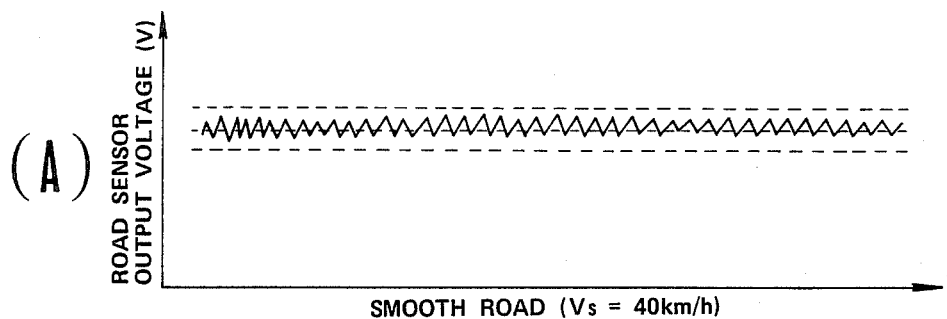
Figure 15:
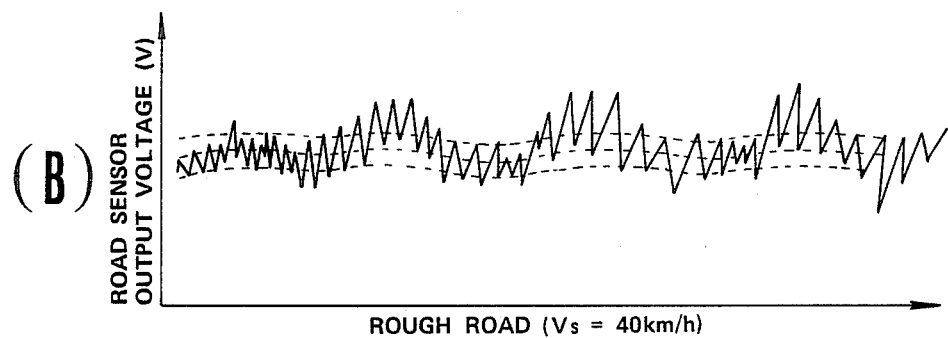
Figure 16:
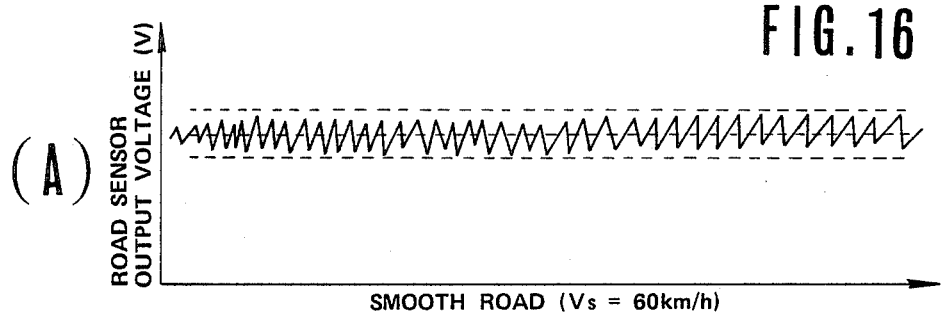
Figure 16:
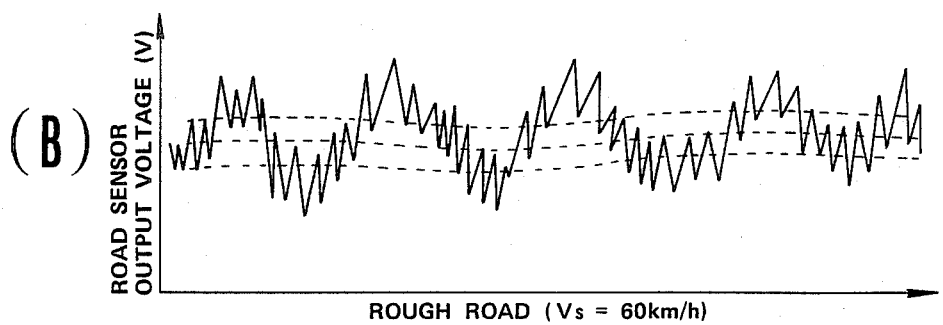
Figure 17:
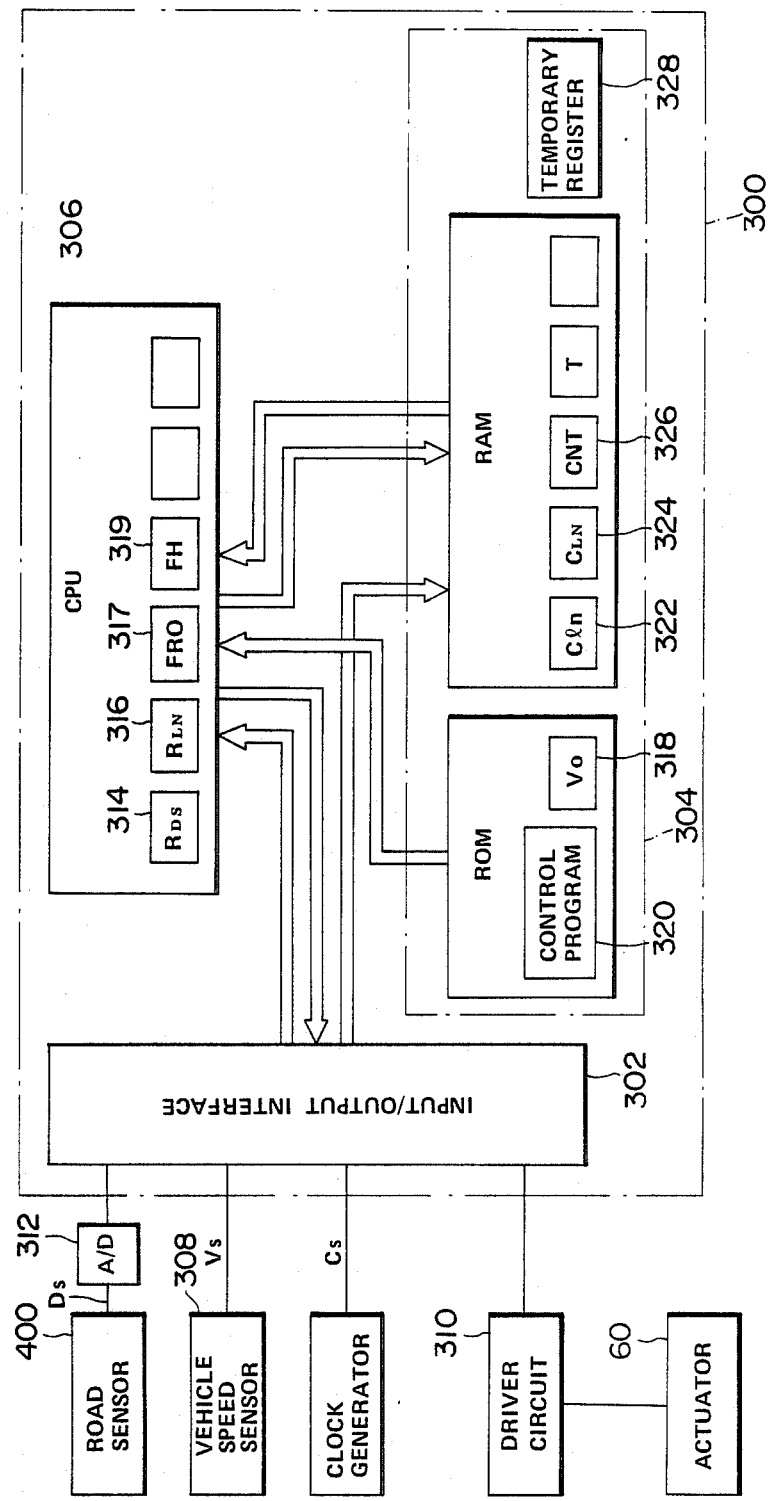
Figure 18:
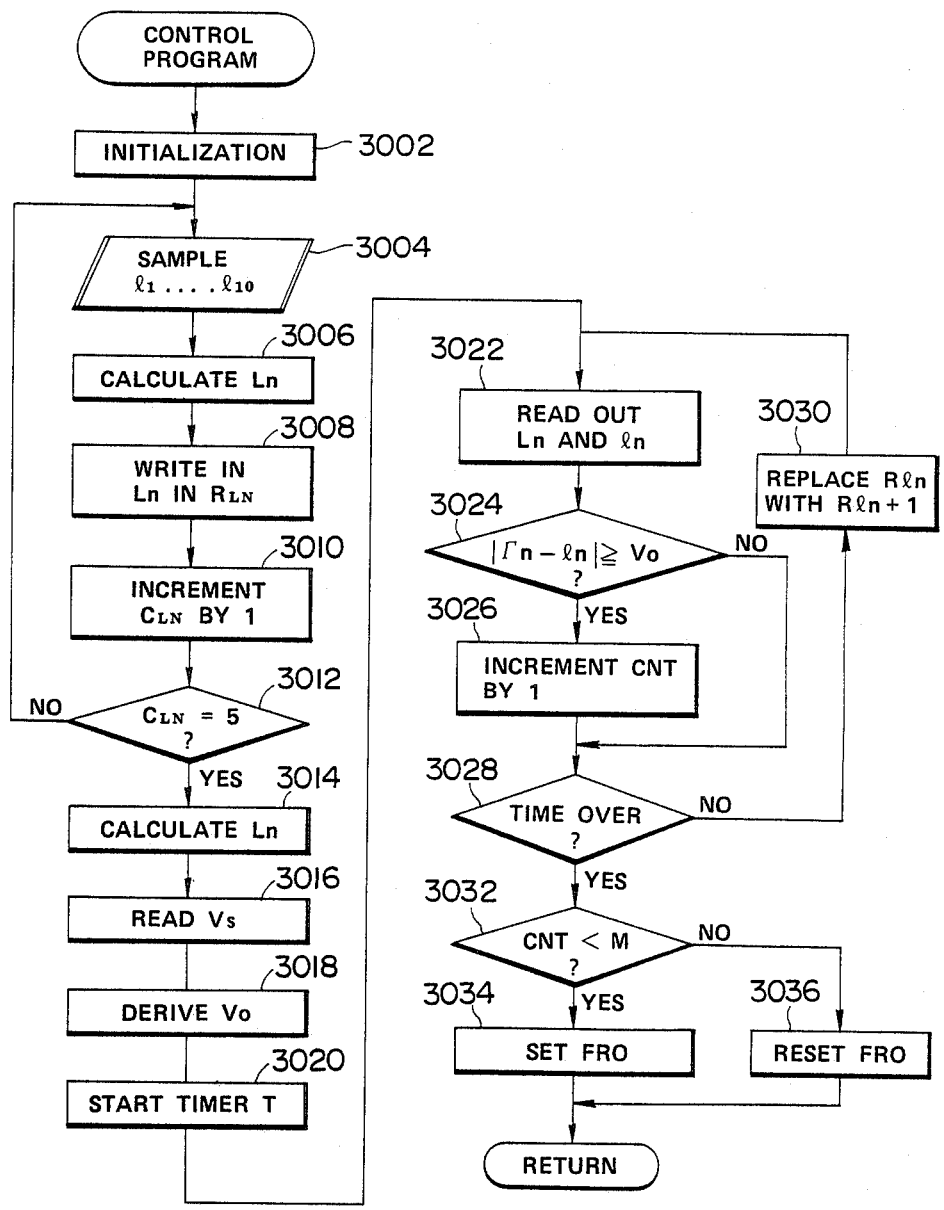
Figure 19:
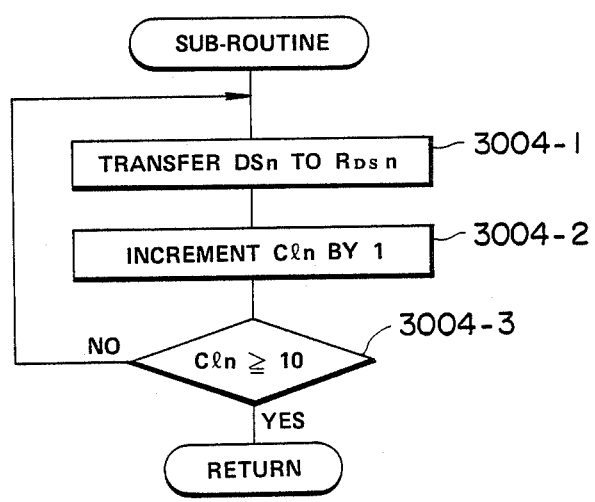

FIGS. 15(A) and 15(B) show the output of the potentiometer of FIG. 14 under different conditions-FIG. 15(A) showing potentiometer output as the vehicle travels along a smooth road at a speed of 40 km/h, and FIG. 15(B) showing potentiometer output as the vehicle travels along a rough road at a speed of 40 km/h;

FIGS. 16(A) and 16(B) show the output of the potentiometer of FIG. 14 in cases where the vehicle is travelling along the same roads as in FIGS. 15(A) and 15(B) but at a higher speed, i.e. 60 km/h;

FIG. 17 is a block diagram of the second embodiment of a torsion modulus control system according to the present invention;

FIG. 18 is a flowchart of a torsion modulus control program to be executed by the control system of FIG. 17;

FIG. 19 is a flowchart of a sub-routine of the control program of FIG. 18; and

Figure 20:
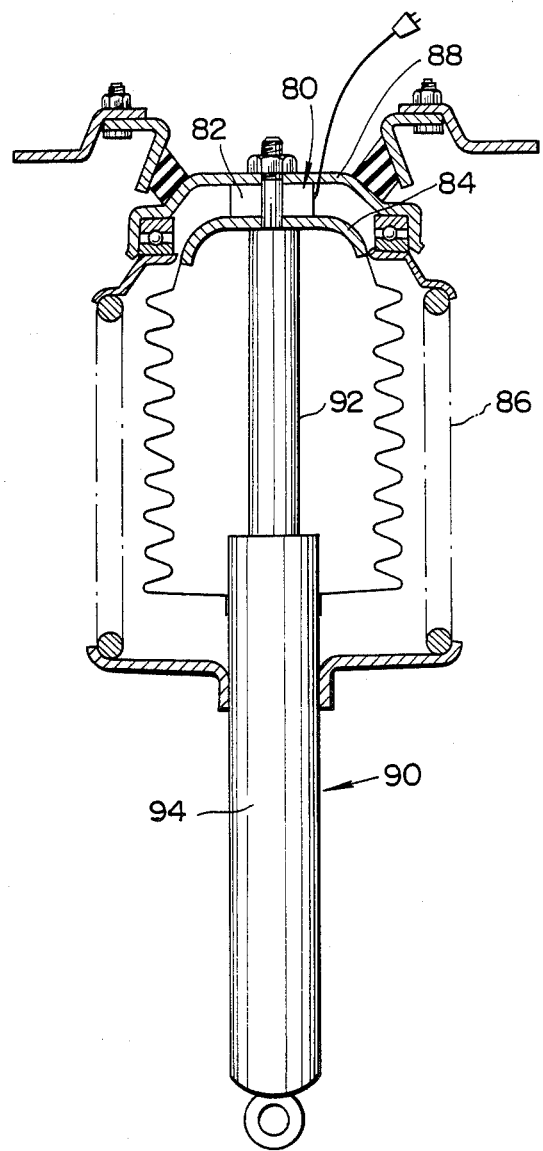

FIG. 20 is a cross-section of a suspension strut assembly including a piezoelectric element serving as a modification of the road sensor of FIG. 14.

DESCRIPTION OF THE PREFERRED EMBODIMENT

Figure 1:
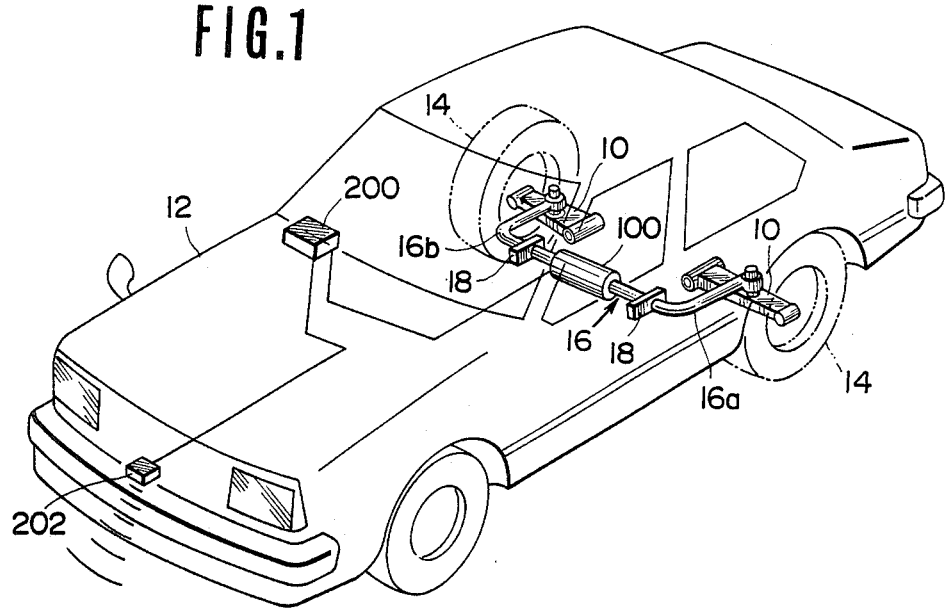
FIG. 1 is a fragmentary perspective illustration of a vehicle having a variable torsion-modulus-type roll-stabilizer according to the present invention.

Referring now to the drawings, particularly to FIG. 1, the vehicle illustrated has a swing-arm-type rear wheel suspension system which comprises suspension arms 10 for supporting the vehicle body 12 in conjunction with the road wheels 14. Although this has not been illustrated, the suspension system may further comprise strut assemblies including shock absorbers and suspension coil springs. The free ends of an essentially U-shaped roll stabilizer 16 are connected to the suspension arms 10. In addition, the roll stabiizer 16 is pivotably suspended from the vehicle body by means of brackets 18.

The stabilizer 16 generally comprises a pair of essentially L-shaped torsion bars 16a and 16b adapted to resist torsion forces generated when the vehicle turns. Throughout this disclosure, this resistance against torsional forces provided by the stabilizer will be referred to as "torsion modulus".

Figure 2:
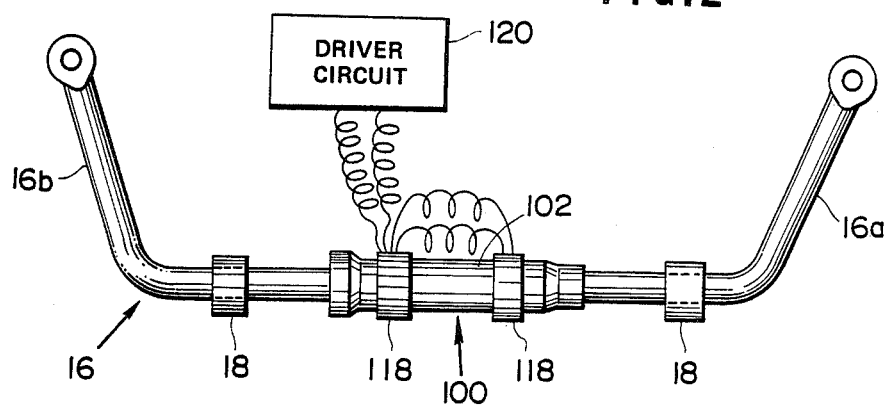
FIG. 2 is an enlarged plan view of the first embodiment of a roll-stabilizer according to the present invention, which roll-stabilizer is illustrated with a torsion modulus controller employing the first embodiment of a torsion modulus control system for the stabilizer.
Figure 3:
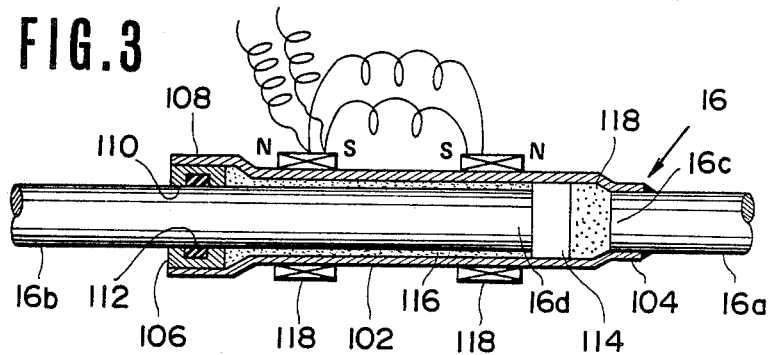
FIG. 3 is a further enlarged lonngitudinal section of part of the stabilizer which shows a torsion modulus adjuster according to the first embodiment of the invention.

As shown in FIGS. 1 to 3, the torsion bars 16a and 16b are connected to each other through a torsion modulus adjusting mechanism 100 which is adapted to adjust the damping characteristic of the suspension system through the modification of the torsion modulus of the stabilizer in a manner set forth below and may be hereafter referred to as "adjuster 100". In the shown embodiment, the adjuster 100 switches the torsion modulus of the stabilizer between a relatively LOW torsion modulus and a relatively HIGH torsion modulus, in two-way fashion. The adjuster is connected to a controller 200 which is, in turn, connected to one or more sensors adaptped to sense a preselected control parameter or parameters. In the shown embodiment, a road sensor 202 is used to sense the smoothness of the road surface. The road sensor 202 is adapted to emit or transmit ultrasonic waves toward the road surface and to detect or receive ultrasonic waves reflected by the road surface. As shown in FIG. 1, the road sensor 202 is mounted at the front end of the vehicle, in the shown embodiment. However, the point at which the road sensor is mounted is not limited to the shown position. Furthermore, a plurality of road sensors may alternatively be used.

FIG. 3 shows the detailed structure of the adjuster 100. The adjuster 100 comprises a hollow cylinder 102 having one end 104 rigidly secured to the end 16c of the torsion bar 16a. A closure 106 is fitted to the other end 108 of the cylinder 102. The closure 106 defines a central opening 110 through which the end 16d of the torsion bar 16b extends into the internal space of the cylinder 102. A sealing ring 112 is fitted on the periphery of the opening 110 to allow thrusting motion of the torsion bar 16b relative to the cylinder while establishing a fluid-tight seal with the outer periphery of the torsion bar 16b. A thrusting piston 114 is provided at the end 16d of the torsion bar 16a within the closed internal space of the cylinder 102. The piston 114 divides the internal space of the cylinder into two chambers 116 and 118 each of which is filled with a magnetic fluid. The magnetic fluid may be a colloidal fluid composed of powdered ferromagnetic material such as magnetite, mangano-ferrite, nickel ferrite or the like, the 100 to 200 Anstrom particles of which are coated with a linear unsaturated fatty acid base surface-active agent such as oleic acid, linolenic acid or the like, dispersed in a solvent such as an aliphatic hydrocarbon, an aromatic hydrocarbon, or water or the like with an anionic detergent. Such colloidal fluids have better dispersiveness than other kinds of suspensions and are not subject to sedimentation or flocculation, i.e. separation of the solid and liquid phases, thus ensuring an even composition with relatively strong magnetism. Therefore, the magnetic fluid set forth above has the characteristics of both a ferromagnetic material and a fluid.

When the magnetic fluid is placed in a magnetic field, the particles of the ferromagnetic material are energized to align with the magnetic field, resulting in differential concentrations of the ferromagnetic material in the fluid. The severity of the concentration differentials is related to the magnitude of the magnetic field appllied. Internal friction in the magnetic fluid is related to the concentration of the ferromagnetic material at the point of maximum concentration in the fluid. This internal friction of the magnetic fluid affects the torsion modulus of the stabilizer 16.

Figure 4:
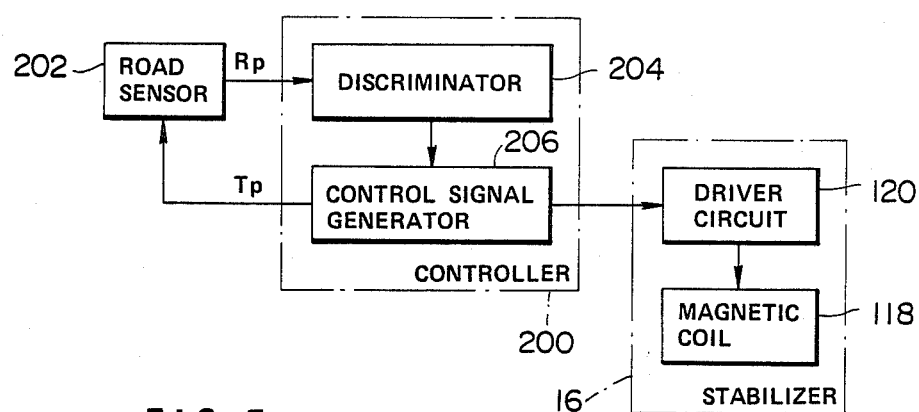
FIG. 4 is a schematic block diagram of the torsion modulus control system according to the present invention, which illustrates the general concepts and procedures of control of the first embodiment of the invention.

In order to apply a magnetic field to the magnetic fluid enclosed in the cylinder 102, magnetic coils 118 are wound around the outer periphery of the cylinder. The coils 118 are connected to a driver circuit 120 which is, in turn, connected to the controller 200 to receive a control signal as shown in FIG. 4. The driver circuit 118 responds to the control signal from the controller 200 by energizing or deenergizing the coils 118. In practice, when the controller 200 judges from the selected control parameters that the torsion modulus of the stabilizer should be HIGH, the driver circuit 120 is operated to feed a driver signal to the coil to excite the coils, and, on the other hand, when the controller 200 judges that the torsion modulus should be LOW, the driver circuit 118 is held inoperative to prevent supply of the driver signal thus holding the coil in a deenergized state.

FIG. 4 schematically shows the fundamental structure of the torsion modulus control system for the stabilizer 16. The control system includes the controller 200, the road sensor 202 and the driver circuit 120. As set forth above, the road sensor 202 produces a pulse-form sensor signal Rp when reflected ultrasonic waves are detected. A discriminator 204 built into the cotroller 200 discriminates road surface conditions on the basis of the intervals between the sensor signal pulses. In practice, the discriminator 204 samples the pulse intervals between a predetermined number of sensor signal pulses and derives the range of variation of the pulse intervals. When the variation range derived from the sampled pulse intervals is within a predetermined range, then the discriminator judges that the vehicle is running on a smooth road. On the other hand, if the variation range is outside of the predetermined range, the discriminator judges that the vehicle is on a rough road.

The discriminator 204 sends a road condition indicative signal to a control signal generator 206 in the controller 200. The control signal generator 206 is responsive to the road condition indicative signal to derive the control signal to be sent to the driver circuit.

As set forth above, when vehicle is judged to be on a smooth road, the control signal goes HIGH to activate the driver circuit. On the other hand, when the road condition indicative signal indicates that the vehicle is on a rough road, the control signal goes LOW to make the driver circuit inoperative.

Figure 5:
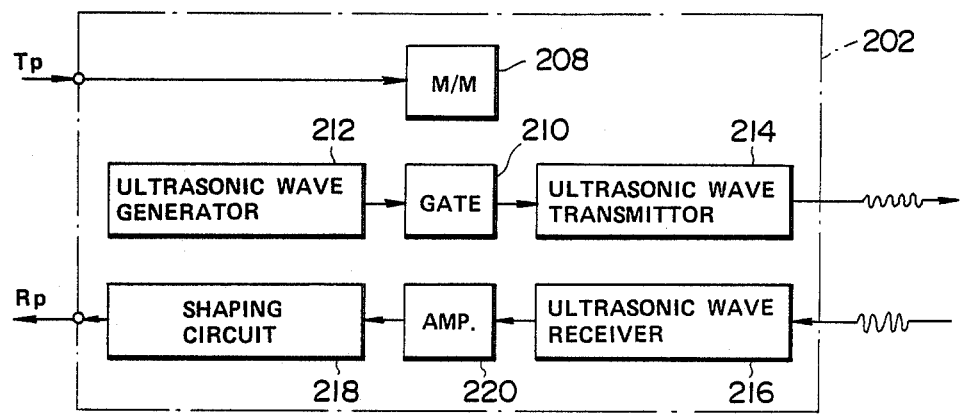
FIG. 5 is a block diagram of a road sensor employed in the torsion modulus control system of FIG. 4.

The control signal generator 206 is also connected to the road sensor 202 to control the operating timing of the latter. In order to control the operation timing of the road sensor 202, the control signal generator 206 sends timing pulses to the road sensor at fixed intervals. As shown in FIG. 5, a timing pulse $T_p$ is received by a monostable multivibrator 208 in the road sensor 202. The monostable multivibrator 208 is triggered by the timing pulse $T_p$ to send a trigger signal to a gate circuit 210 which is interposed between an ultrasonic wave generator 212 and an ultrasonic wave transmitter 214. The gate circuit 210 becomes conductive in response to the trigger signal from the monostable multivibrator 208 and so passes the ultrasonic waves to the transmitter 214. Then, the ultrasonic waves are transmitted towards the road surface through the transmitter 214. Reflected components of the ultrasonic waves are received by a ultrasonic receiver 216. The receiver sends the received ultrasonic wave to a shaping circuit 218 through an amplifier 220. The shaping circuit 218 outputs the sensor signal Rp whenever reflected ultrasonic waves are detected by the receiver 216.

It should be appreciated that such a road sensor for detecting road surface conditions has been disclosed in Japanese Patent First Publication Nos. 56-153267 and 56-153268, both published on Nov. 27, 1981. The disclosure of the above-identified Japanese Patent First Publications would be hereby incorporated by reference for the sake of disclosure. In addition, although a road sensor detecting road conditions by means of ultrasonic wave has been specifically disclosed in the preferred embodiment of the invention, the sensor is not necessarily an ultrasonic-based sensor but can use light, laser beams and so forth. For example, U.S. Pat. No. 4,105,216, issued on Aug. 8, 1978, to Donald E. Graham et al, Japanese Patent First Publication No. 57-182544, published on Nov. 10, 1982, and British Patent First Publication No. 2,090,495, published on July 7, 1982 respectively disclose sensors for detecting road surface conditions or displacement of sprung and unsprung masses in the vehicle suspension system photo-electrically. The contents of these publications are hereby incorporated by reference for the sake of disclosure. Furthermore, Japanese Patent First Publication No. 59-42468, published on Mar. 9, 1984, discloses a procedure for discriminating unevenness of the road surface on the basis of a road sensor utilizing ultrasonic waves. The disclosed procedure in this Japanese Patent First Publication is also hereby incorporated by reference for the sake of disclosure.

Figure 6:
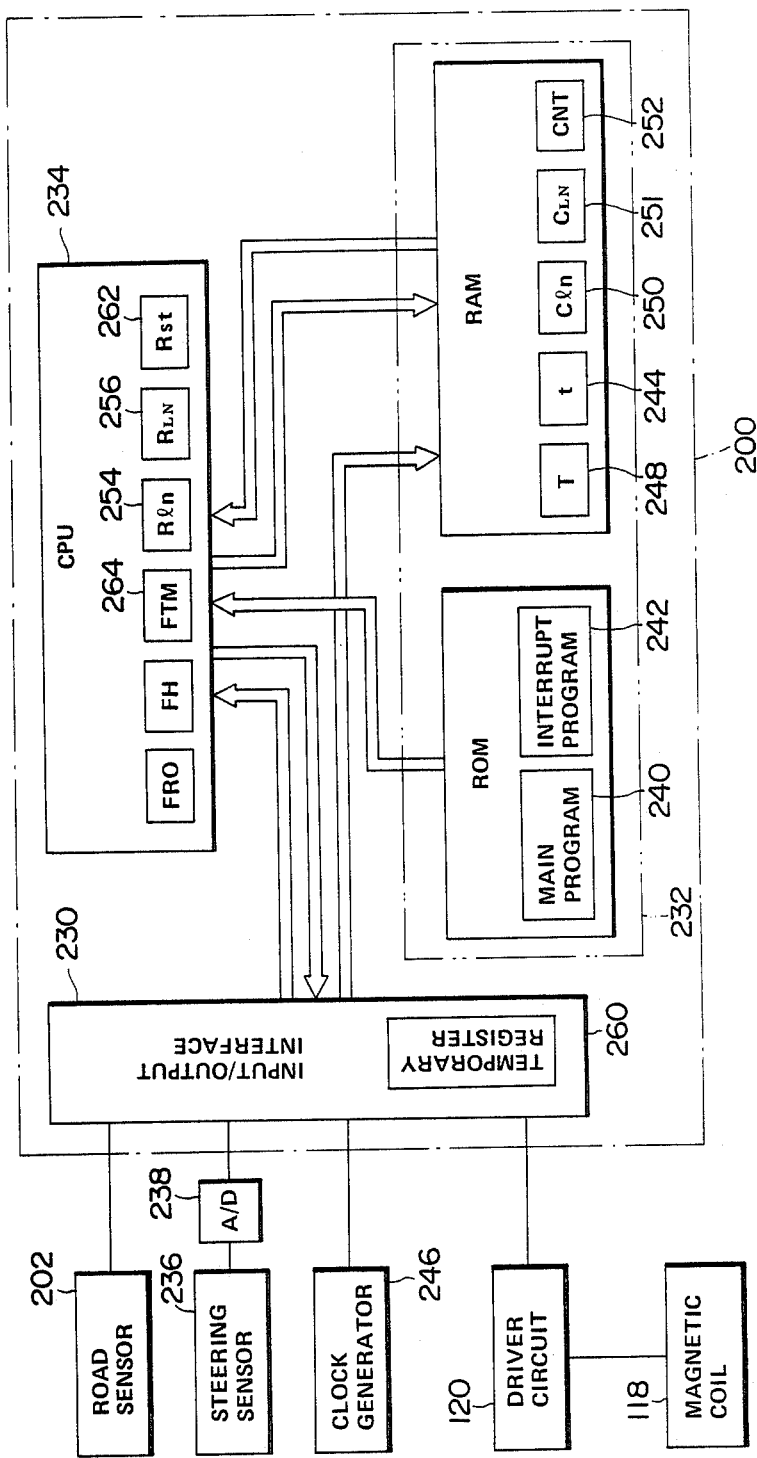
FIG. 6 is a block diagram of the first embodiment of the torsion modulus control system of the present invention, which shows more details of the circuitry than FIG. 4.

The torsion modulus control system in accordance with the first embodiment of the invention will be described in detail with reference to FIGS. 6 to 10. As shown in FIG. 6, the controller 200 of this first embodiment comprises a microprocessor including an input/output interface 230, memory 232 including RAM, ROM and registers, and a CPU 234. The controller 200 is connected to the road sensor 202 through the input/output interface 230. Also, the controller 200 is connected via the interface 230 to a steering sensor 236 which detects the angular steering position with respect to its neutral position and produces a steering position indicative signal. The controller 200 is also connected to the driver circuit 120 to energize or deenergize the coil 118 by means of the control signal.

Figure 7:
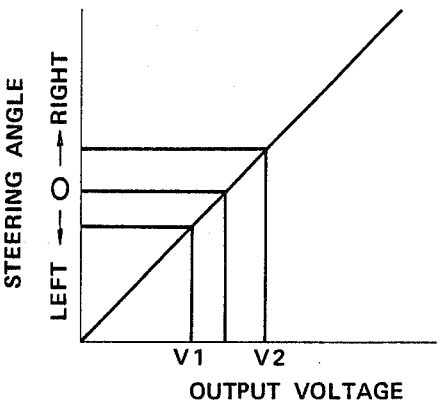
FIG. 7 is a graph of the output voltage of steering sensor in the torsional modulus control system of FIG. 6vs. steering angle.

The road sensor 202 comprises the circuitry set forth with reference to FIG. 5 and sends the pulse-form road sensor signal to the controller 200 via the interface 230. On the other hand, the steering sensor 236 may comprise a kind of potentiometer, the output voltage of which depends on the angular steering position as shown in FIG. 7. Since the steering sensor 236 of the shown embodiment thus produces an angular steering position-indicative analog signal which will be hereafter referred to as "steering sensor signal", an analog-to-digital (A/D) converter 238 is inserted between the steering sensor 236 and the interface 230.

A potentiometer-type steering sensor would be mounted near or on a steering column (not shown) is such a way that its total resistance will vary according to the angular position of the steering wheel with respect to its neutral position. Though the steering sensor illustrated in the shown embodiment was chosen because it could be easily applied to the torsion modulus control system of the first embodiment, the steering sensor may take numerous other forms. For example, U.S. Pat. No. 4,342,279, to Yasutoshi SEKO et al and assigned to the assignee of this invention, discloses a device for detecting steering angle and steering direction of a steering wheel in an automotive vehicle, including a pair of fixed contacts and a movable contact. The movable contact is arranged in connection with the fixed contacts in such a way that, when the steering wheel rotates in one direction, the movable contact engages only the first fixed contact, and when the steering wheel rotates in the opposite direction, the movable contact engages only the second fixed contact. Upon the basis of signal produced whenever the movable contact contacts one of the fixed contacts, the steering angle and steering direction are detected. The device further comprises a counter which counts occurrences of contact with one of the fixed contacts to monitor the angular position of the steering wheel. In the co-pending U.S. patent applications Ser. Nos. 580,175 and 580,174, both filed on Feb. 15, 1984 and commonly assigned to the assignee of this invention, a steering sensor which detects steering angle variation photoelectrically is illustrated.

Such steering sensors may be applied to the control system of the present invention. Therefore, the contents of U.S. Pat. No. 4,342,279 and U.S. patent applications Ser. Nos. 580,175 and 580,174 are hereby incorporated by reference.

Figure 8:
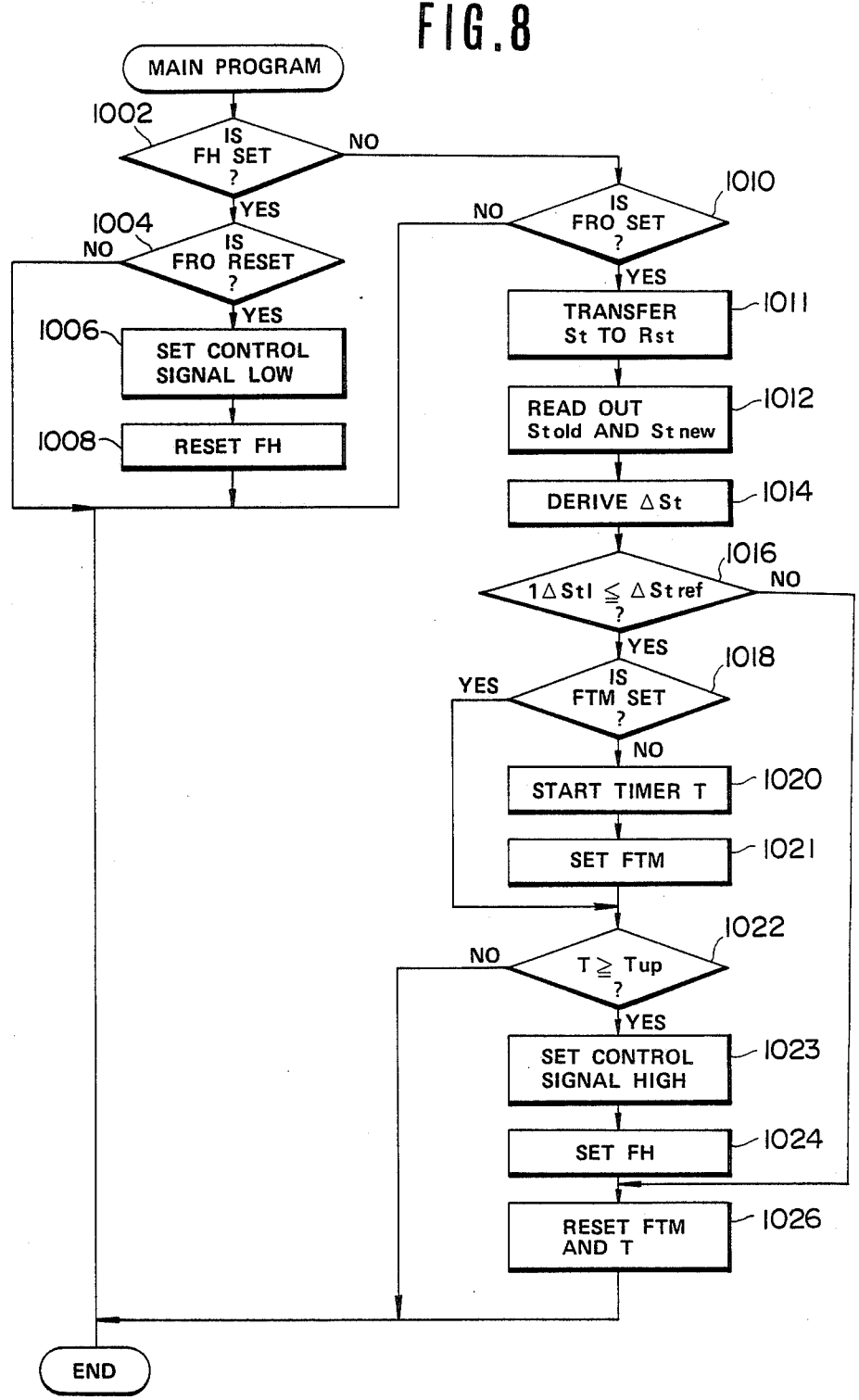
FIG. 8 is a flowchart of a main program to be executed by the control system of FIG. 6.
Figure 9:
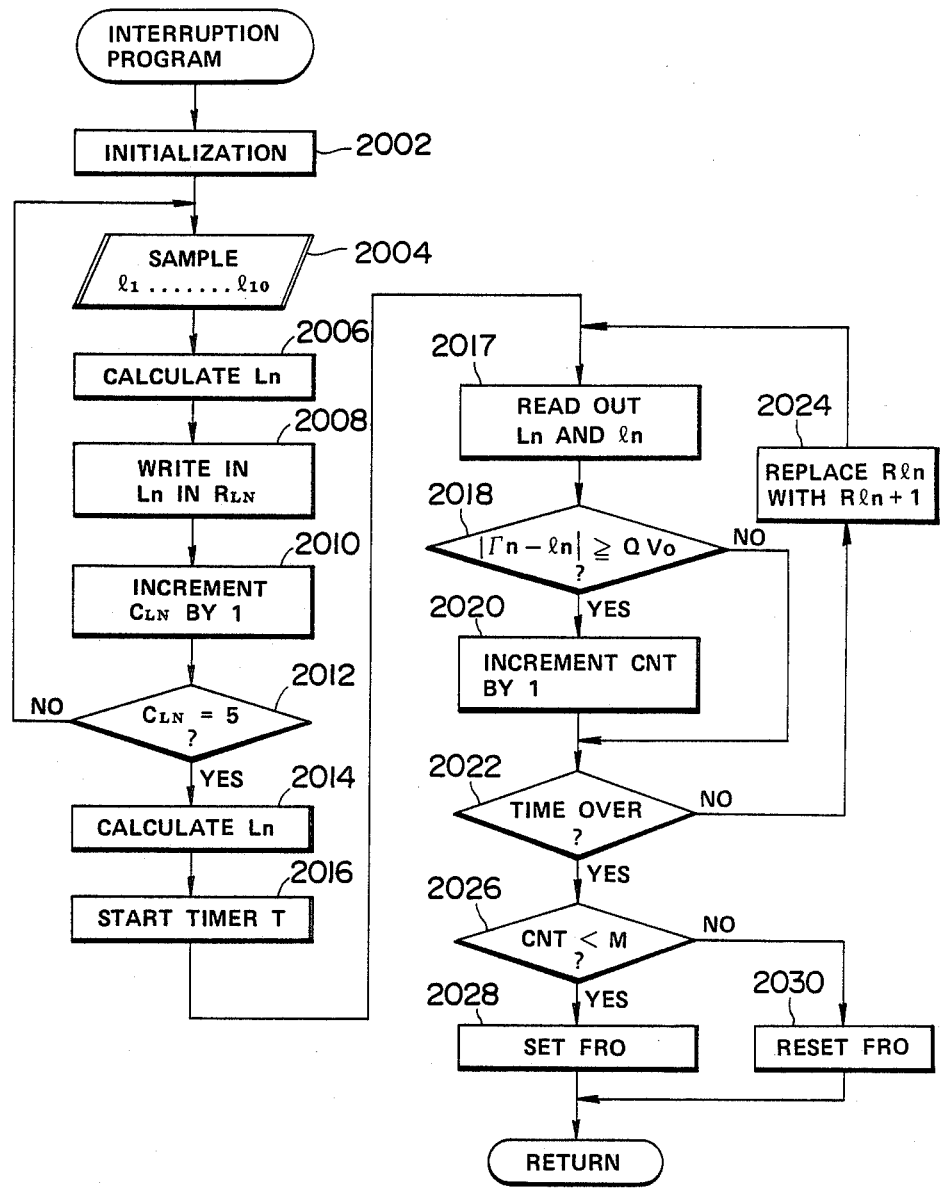
FIG. 9 is a flowchart of an interrupt program to be executed independently of the main program of FIG. 8.
Figure 10:
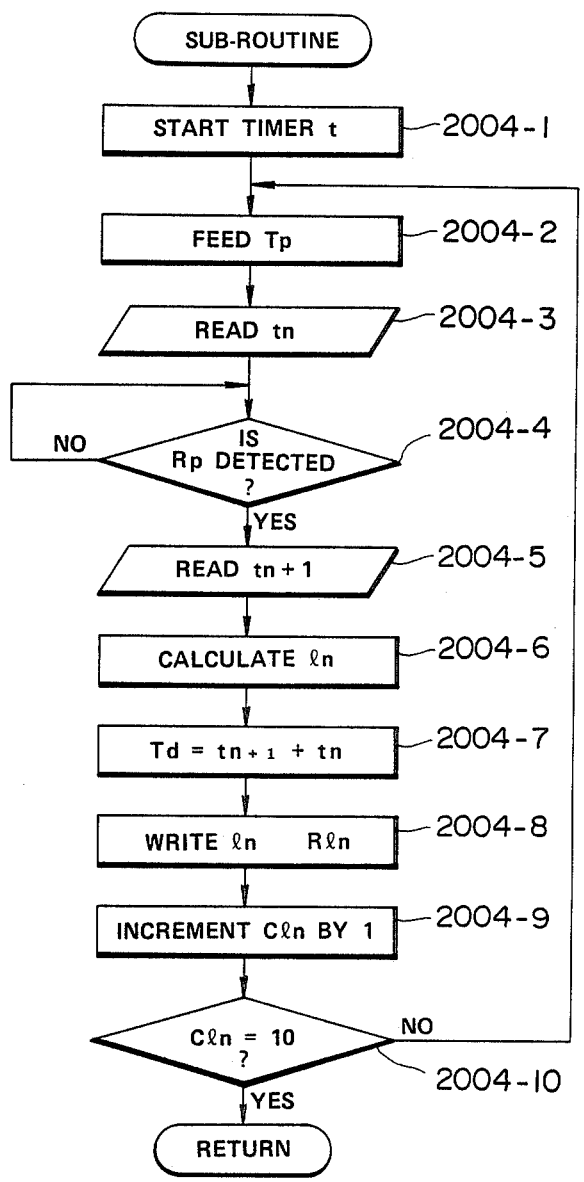
FIG. 10 is a flowchart of a sub-routine of the interrupt program of FIG. 9.

The ROM of the controller 200 includes a memory block 240 storing the main program illustrated in FIG. 8 (to be explained in detail later) and a memory block 242 storing an interrupt program for processing the road sensor signals for monitoring road surface conditions, as illustrated in FIGS. 9 and 10 and will be explained later with respect thereto.

RAM of the controller 200 includes a counter t 244 connected to a clock signal generator 246 to count the clock signal pulses in order to measure the interval between successive road sensor pulses, and a counter T 248 also connected to the clock generator 246 to count clock pulses. Though the counters t and T 244 and 248 are illustrated separately for the sake of disclosure, they can in practice constitute a single common counter performing the required functions on a time-sharing basis. RAM further has counters $C_{ln}$ and $C_{Ln}$ 250 and 251 and a counter CNT 252.

CPU 234 has flag registers FRO and FH. The flag register FRO is set when the road surface is smooth and is reset when a rough road is detected. The flag register FH is set when the coils 118 are energized to stiffen the stabilizer and is reset when the coils 118 are deenergized. The CPU also has a block of registers 254 including 10 cells $R_{l1}, \ldots R_{l10}$ each of which is adapted to store distance data indicative of the vehicle-body-to-road-surface distance derived on the basis of measured time interals between successive road sensor signal pulses Rp, and a register 256 including 5 cells $R_{L1} \ldots R_{L5}$ each of which is adapted to store an average distance value $L_n$ between the body and the road surface.

Operation of the above control system will be described hereafter with reference to FIGS. 8 to 10. FIG. 8 is a flowchart of the main program to be executed periodically. The main program can be interrupted arbitrarily by the interrupt program of FIGS. 9 and 10. The interrupt program of FIGS. 9 and 10 is adapted to monitor surface conditions of the road and set or reset the flag registr FRO depending upon the road surface conditions.

Referring to FIG. 8, immediately after starting execution of the main program, the flag register FH is checked at a step 1002 to judge if the torsion modulus of the stabilizer 16 is currently HIGH or LOW. If the flag register FH is in the set state, the register FRO is checked at a step 1004. When the register FRO is in the set state, program ends. On the other hand, when the register FRO is in its reset state, then, the control signal is changed to the LOW level to change the torsion modulus of the stabilizer to its lower level at a step 1006. After this, the register FH is reset at a step 1008. Then, the program ends.

If the register FH is reset when checked at the step 1002, then the register FRO is checked as in the step 1004, at a step 1010. If the register FRO is reset when checked at the step 1010, the program ends. If the register FRO is set when checked at the step 1010, then steering sensor signal St is read from a temporary register 260 in the interface and written into a register $R_{St}$ 262 at a step 1011. The register $R_{St}$ is adapted to store the current steering sensor signal value $St_{new}$ and the steering sensor signal value $St_{old}$ from the immediately preceding cycle, and to replace the older steering angular position data, i.e. steering angle sensor value $St_{old}$ with the fresh steering sensor signal value as $St_{new}$ upon receipt of a fresh steering sensor signal. At a step 1012, the steering sensor signal values $St_{new}$ and $ST_{old}$ are read from the register $R_{St}$. These values are compared at a step 1014 to derive the difference $\Delta St$ therebetween. The derived difference is checked with a predetermind reference value $\Delta St_{ref}$ which defines a steering angle variation range representing the absence of significant steering adjustment at a step 1016.

When the absolute value $|\Delta St|$ is equal to or less than the reference value $\Delta St_{ref}$, when checked at the step 1016, then, a timer flag register FTM 264 is checked at a step 1018. If the timer flag register FTM is in its reset state, then the timer T 248 is started at a step 1020 and FTM is set at a step 1021. After this step 1020, the timer value T is read out and compared with a time-over reference value $T_{up}$ at a step 1022. If the timer value T is less than the time-over reference $T_{up}$, then the program ends. In this case, since the flag register FH was in the reset state when checked at the step 1002 and the status of the flag register FH is unchanged, the coils 118 will still be in the deenergized position so that the torsion modulus of the stabiilzer will remain LOW. On the other hand, when the timer value T reaches the time-over reference $T_{up}$, the control signal is changed to its HIGH level at a step 1023 and the flag register FH is set at a step 1024. As a result, the coils 118 are energized to change the torsion modulus of the stabilizer to HIGH. After this, the timer T and the timer flag register are reset at a step 1026.

If the timer flag FTM is in its set state when checked at the step 1018, the step 1020 of starting the timer T is skipped and the program goes directly to the step 1022. On the other hand, if the absolute value of the difference St between the new and old steering sensor signal values $St_{new}$ and $St_{old}$ exceeds the reference value $St_{ref}$ when checked at the step 1016, then the program jumps to the step 1026 to reset the timer T and the timer flag register FTM.

The steps 1011 to 1026 judge the vehicle driving state. Conceptually, when the vehicle is on a curved road it will occasionally roll due to compliance of the suspension. If this occurs just after travelling over a rough road, the stabilizer may remain excessively stiff causing the vehicle to be held in transversely inclined state. The steps 1011 to 1026 prevent this satisfactorily.

FIGS. 9 and 10 show the interrupt program. Initialization takes place at the initial step 2002. In the initialization step, the timers t and T 244 and 248, the registers $R_{ln}$ and $R_{lLn}$ 254 and 256, and counters $C_{ln}$ and $C_{lLn}$ 250 and 251 are all reset. After this, the sub-routine illustrated in FIG. 10 is performd at a step 2004.

In the sub-routine of FIG. 10, a timer t 244 is started at a step 2004-1. A timing pulse Tp is fed to the monostable multivibrator 208 at a given timing, e.g. every 0.02 sec., to periodically trigger the latter, at a step 2004-2. Whenever the monostable multivibrator 208 is triggered, the road sensor transmits ultrasonic waves toward the road surface through the ultrasonic transmitter 214. Immediately after or at approximately the moment of receipt of the timing pulse Tp by the monostable multivibrator, the timer value tn is read and stored in a temporary register 266, at a step 2004-3. Then, the road sensor signal Rp is checked at a step 2004-4. The step 2004-4 is repeatedly performed until a road sensor signal pulse Rp is received. After a road sensor signal pulse Rp is detected, the timer signal value $t_{n+1}$ is read and stored in the temporary register 260, at a step 2004-5. Thereafter, the difference Td between the timer signal values $t_n$ and $t_{n+1}$ is calculated at a step 2004-6. The obtained difference Td is indicative of the time period between transmission and reception of one burst of ultrasonic waves. Since the ultrasonic waves travel at approximately the speed of sound V, the distance ln between the road sensor and the road surface can be calculated from:

$$l_n = V \times Td/2$$

Calculations according to this equation are performed at a step 2004-7. The derived distance value $l_n$ is written into the corresponding block $Rl_n$ of the register 254 at a step 2004-8. Thereafter, the counter $Cl_n$ is incremented by 1 at a step 2004-9. The counter value $Cl_n$ is compared with 10 at a step 2004-10. If the counter value $Cl_n$ is less than 10, control returns to the step 2004-2. On the other hand, when the counter value $Cl_n$ reaches 10, the sub-routine ends and control returns to the next step of the interrupt program of FIG. 9.

As will be appreciated herefrom, distance $l_1 \ldots l_{10}$ are sampled and stored in the register 254 during execution of the sub-routine.

Returning to the interrupt program of FIG. 9, at a step 2006, average $L_n$ of the ten stored distance values in the register 254 is calculated from:

$$L_n = \sum_{n=1}^{10} l_n/10$$

The obtained result $L_n$ is written into the corresponding block $R_{L1} \ldots R_{L5}$ of the register 256, at a step 2008. Then, the counter $C_{Ln}$ is incremented by 1 at a step 2010. The counter value $C_{Ln}$ is compared with 5 at a step 2012. If counter value $C_{LN}$ is less than 5, control returns to the step 2004 to repeat the steps 2004 to 2010 five times in order to obtain five average values $L_1 \ldots L_5$. When the counter value $C_{Ln}$ reaches 5, then a reference value $\overline{L_n}$ is calculated by averaging the average values $L_1 \ldots L_5$ according to:

$$\overline{L_n} = \sum_{n=1}^{5} l_n/5$$

at a step 2014. At that time, the timer T is started to measure running time, at a step 2016.

At a step 2017, the reference value $\overline{L_n}$ and the distance data $l_n$ are read out. The reference value $\overline{L_n}$ is compared with the distance data stored in the register 254 at a step 2018. If an absolute value $|\overline{L_n} - l_n|$ is equal to or greater than a reference differential value $V_0$, then the counter value CNT of counter 252 is incremented by 1 at a step 2020. Thereafter, the timer T is checked with a time-up threshold, at a step 2022. On the other hand, when the absolute value $|\overline{L_n} - l_n|$ is less than the differential threshold $V_0$, then, the step 2020 is skipped and control goes directly to the step 2022. If time is not yet up, the CPU accesses the next block $Rl_{n+1}$ of the register 254 holding the next distance value $l_{n+1}$ and replaces the distance value $l_n$ compared with the reference value $\overline{L_n}$ with the next distance value $l_{n+1}$, at a step 2024. Thereafter control returns to the step 2017. The steps 2017 to 2024 form a loop to be repeated until a predetermined period of time, e.g. 1 sec. expires and expiration of the predetermined period of time is recognized at the step 2022. During execution of the interrupt program, time intervals between the road sensor pulses Rp are sampled approximately every 0.02 sec. Average distance between the vehicle body and the road surface is thus calculated every 0.2 sec. on the average. Therefore, overall run time of the interrupt program may be slightly more than 1 sec.

After the predetermined period of time expires, the counter value CNT is compared with a road condition threshold M at a step 2026. If the counter value CNT is less than the road condition threshold M, the register FRO is set at a step 2028. On the other hand, when the counter value CNT is equal to or greater than M, the register FRO is reset at a step 2030.

It should be appreciated that, although the shown embodiment has been directed to the swing-arm type suspension system with the roll stabilizer, the present invention is not limited in application to such swing-arm suspensions but is applicable to any type of suspension systems to which a roll stabilizer is applicable.

FIGS. 11 to 18 show the second embodiment of torsion modulus control for the roll stabilizer according to the present invention.

Figure 11:
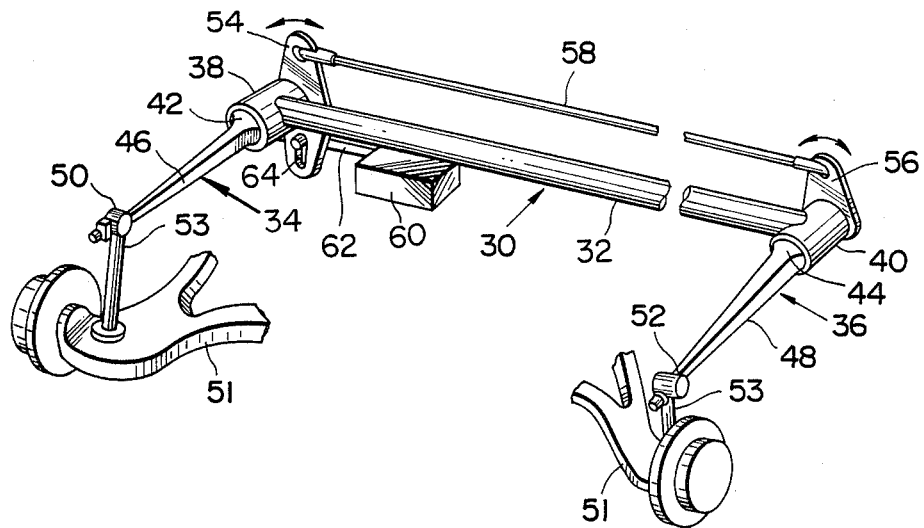
FIG. 11 is a perspective view of the second embodiment of a roll-stabilizer acording to the present invention.
Figure 12:
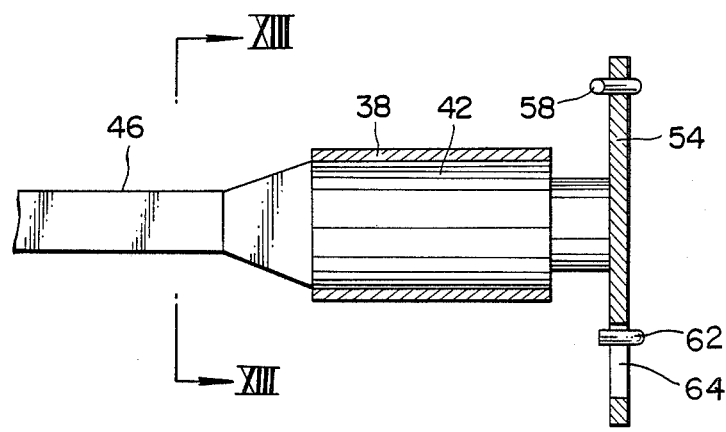
FIG. 12 is an enlarged section of the major part of the roll-stabilizer of FIG. 11.

FIGS. 11 and 12 show the structure of a roll stabilizer 30 to be utilized in the second embodiment. The roll stabilizer 30 comprises a transverse bar section 32 and a pair of parallel bar sections 34 and 36. The transverse bar section 32 extends essentially perpendicular to the vehicle axis and has a circular cross-section. The transverse bar section 32 is connected to hollow cylndrical bearing sections 38 and 40 at both ends. The parallel bar sections 34 and 36 have end segments 42 and 44 of circular cross-section adapted to rotatably engage the bearings 38 and 40 of the transverse bar section 32. The parallel bar sections 34 and 36 also have rectangular cross-section major sections 46 and 48, each of which has one end 50 and 52 connected to a suspension arm 51 through a connecting rod 53 which allows free rotation of the associated bar 34 or 36.

The cylindrical cross-section end segments 42 and 44 of the parallel bar sections 34 and 36 extend beyond the ends of the bearing portions 38 and 40. Link plates 54 and 56 are rigidly fitted onto the protruding ends of the parallel bar sections 34 and 36. The link plates 54 and 56 are rotatable about the bearing sections 38 and 40 together with the parallel bar sections 34 and 36. The link plates are connected to each other through a linkage 58. In addition, the link plate 54 is associated with an actuator 60 through an actuation rod 62 engaging to an elongated opening 64 of the link plate 54. The actuator 60 may comprise an electromagnetically operative solenoid. The actuator is adapted to be energized by a control signal fed from a controller 300 to rotate the link plate 54 along with the parallel bar section 34 through 90° from the shown neutral position. When the actuator 60 is energized, the link plate 56 is also rotated according to rotation of the link plate 54 to pivot the parallel bar 36 through 90° within the bearing section 40.

Figure 13:
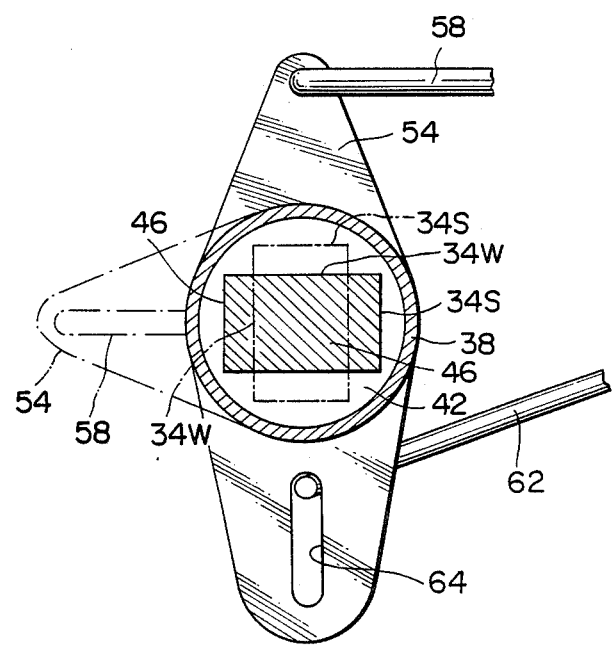
FIG. 13 is a cross-section taken along line XIII—XIII of FIG. 12.

As shown in FIG. 13, at the neutral position, the parallel bar sections 34 and 36 lie with their wider sides 34w (36w) horizontal. At this position, since resistance of the parallel bar sections 34 and 36 against vertical bending moment which is applied when the vehicle wheel bounds or rebounds is relatively small, the torsion force to be applied to the transverse bar section 32 of the stabilizer 30 is large. When the actuator 60 is energized, the parallel bar sections 34 and 36 are rotated to lie with their shorter sides 34s (36s) horizontal, as shown in phantom line in FIG. 13. At this position, the bending stress of the parallel bar sections 34 and 36 is increased, i.e., the torsion force to be applied to the transverse bar section 32 of the stabilizer becomes smaller.

When an essentially smooth road surface is detected by a road sensor 400 which can be the same as the sensor 202 of the foregoing first embodiment or some other sensor, one variation of which will be illustrated later, the actuator 60 may be energized to enforce a HIGH torsion modulus for the stabiilzer 30. On the other hand, when a rough road surface is detected by the road sensor 400, the actuator 60 is deenergized to return the torsion modulus of the stabilizer 30 to the lower level.

FIG. 14 illustrates another road sensor used in the second embodiment, which may be generally referred to as "road sensor 400". The road sensor 400 generally comprises a linear potentiometer associated with a shock absorber 402 which is cooperative with a suspension coil spring 404 for damping relative displacement between the vehicle body and the wheel axle extending from a wheel hub 406 of the suspension arm 51. The linear potentiometer of the road sensor 400 is adapted to measure movement of the piston of the shock absorber 402.

FIGS. 15(A) and 15(B) respectively show variation of the outputs of the road sensor 400 on a smooth road and on a rough road while the vehicle is moving at 40 km/h. On the other hand, FIGS. 16(A) and 16(B) show variation of the outputs of the road sensor 400 as the vehicle travels over a smooth road and over a rough road at a speed of 60 km/h. As will be appreciated herefrom, when the vehicle is travelling over an essentially smooth road, the piston stroke of the shock absorber 402 is relatively short and its frequency is relatively high. Although the amplitude of vibration may vary with vehicle speed, the variation range of the road sensor outputs is fairly constant and relatively narrow while the vehicle is running on a smooth road. On the other hand, as will be seen from FIGS. 15(B) and 16(B), variation of the road sensor outputs on a rough road is relatively great. Therefore, by detecting the variation range of the road sensor outputs, it can be recognized whether the vehicle is travelling on a smooth road or a rough road.

Experimentation has shown that when vehicle travels along a smooth road, the road sensor output has a frequency of approximately 12 to 13 Hz due to vibration of the unsprung wheel axle in response to relatively small unevennesses in the road surface, and, when the vehicle moves along a rough road, the road sensor output contains a combination of the high-frequency component at 12 to 13 Hz due to small unevennesses in the road surface and a low-frequency component at 1 to 2 Hz due to relatively large unevennesses in the rough road. Therefore, when the road sensor outputs are averaged, the average value for the smooth road will become approximately zero when the high-frequency vibration component is eliminted. On the other hand, when the vehicle travels along a rough road, the average value will remain relatively great even after the high-frequency component is eliminated.

In the shown embodiment, the road sensor outputs are sampled periodically, e.g. every 0.02 sec. An average value Ln is obtained from ten sampled road sensor outputs. In order to eliminate the high-frequency component, a given number of average values are again averaged. The given number M is selected so as to obtain a cut-off frequency fc equal to or less than 0.5 Hz, which may be determined from:

$$m = 0.443/(T \times 10 \times fc) = 4.43$$

where m is the number of the average values to be averaged, T is the inter-pulse interval, in this case about 0.02 sec., and fc is the cut-off frequency.

As will be appreciated herefrom, when 5 average values are again averaged, the cut-off frequency becomes equal to or less than 0.5 Hz and thus the high-frequency component can be successfully eliminated. The average value Ln obtained by further averaging of the average values Ln will be hereafter referred to as "reference value". This reference value may vary as illustrated in dotted line in FIGS. 15(A), 15(B), 16(A) and 16(B). Thus, the surface quality of the road, at least to the extent of distinguishing rough roads from smooth roads, can be discerned by comparison of the road sensor output values with the reference value. A smooth road surface is recognized when the difference V between the reference value Ln and the road sensor output value $DS_n$ is within a given range as defined by a threshold $V_0$. The threshold $V_0$ may adjusted depending upon the vehicle speed Vs. When the difference between the road sensor outputs $DS_n$ and the reference value Ln is greater than the threshold $V_0$, it may be judged that the vehicle is moving on a rough road.

According to the aforementioned procedure, the controller 300, as shown in FIG. 17 adjusts the torsion modulus of the stabilizer depending upon road conditions.

Similarly to the aforementioned first embodiment, the controller comprises a microprocessor including an input/output interface 302, a memory 304 including RAM and ROM, CPU 306 which includes a plurality of registers described later in conjunction with a control program. The interface 302 of the controller 300 is connected to the road sensor 400 and a vehicle speed sensor 308 which is per se well known. In addition, the interface 302 is connected to a driver circuit 310 of the actuator 60 to supply the control signal Cs. Since the road sensor output DS is in the form of an analog signal, an analog-to-digital (A/D) converter 312 is required to generate a binary signal corresponding to the road sensor output.

CPU 306 has a register 314 including a plurality of memory cells $R_{DS1}$, $R_{DS2}$... corresponding one-to-one with road sensor output values $DS_1$, $DS_2$..., a register 316 including 5 cells blocks $R_{L1}$... $R_{L5}$ which hold respectively corresponding average values $L_n$. CPU 306 also includes a register 317 sorting a road condition indicative flag FRO which is set when a smooth road surface is detected and reset when the when the actuator 60 is in its deenergized position.

ROM has a memory block 318 storing threshold values $V_0$ in the form of a look-up table which may be accessed in terms of the vehicle speed sensor signal value Vs. ROM also has memory blocks 320 storing a control program executed periodically to control the torsion modulus of the stabilizer 30. If necessary, the control program may be separated into a main program which may be similar to that illustrated in FIG. 8 and an interrupt program for setting and resetting the road condition indicative flag FRO similar to the interrupt program of FIGS. 9 and 10.

In the control program of FIG. 18 and 19, the system is initialized at an initial step 3002. Initialization includes resetting of counters $C_{ln}$ 322 which count sampled road sensor signals, counter $C_{Ln}$ 324 which counts the number of average values derived, counter CNT 326 which counts occurrences of the difference V between the road sensor signal value $l_n$ and the reference value Ln being equal to or greater than the threshold $V_0$, as well as previously-mentioned registers FRO, FH, 317 and 319.

Then, at a step 3004, a sub-routine illustrated in FIG. 19, is executed to sample 10 road sensor signal values $l_1 \ldots l_{10}$.

In the sub-routine, the road sensor value $DS_n$ is read and transferred to the corresponding memory block $R_{DSn}$ at a step 3004-1. Then, a counter $Cl_n$ is incremented by 1 at a step 3004-2. The counter value $Cl_n$ is compared with "10" at a step 3004-3. If the counter value $Cl_n$ is less than 10, control returns to the step 3004-1. This loop of the steps 3004-1, 3004-2 and 3004-3 is repeated approximately every 0.02 sec. and continues until the counter value $Cl_n$ reaches 10.

When the counter value $Cl_n$ reaches 10, then counter C is reset at a step 3004-4. Then, control returns to the main program and the average value Ln is derived from:

$$L_n = \sum_{n=1}^{10} l_n/10$$

at a step 3006. The derived average value Ln is written into a temporary register 328 in the memory 304 at a step 3008.

Thereafter, the counter $C_{Ln}$ is incremented by 1 at a step 3010. The counter value $C_{Ln}$ is compared with "5" at a step 3012. If the counter value $C_{Ln}$ is less than 5, control returns to the step 3004. On the other hand, when the counter value $C_{Ln}$ reaches 5, the reference value $\overline{L_n}$ is calculated at a step 3014 from:

$$\overline{L_n} = \sum_{n=1}^{5} Ln/5$$

Then, the vehicle speed sensor signal value $V_s$ is read out at a step 3016. On the basis of the read vehicle speed sensor signal value $V_s$, the look-up table in the memory block 318 in ROM is accessed to retrieve a threshold value $V_0$, at a step 3018. The obtained threshold value $V_0$ is stored in the temporary register 328. The timer T is then started at a step 3020.

At a step 3022, the reference value $\overline{L_n}$ and the road sensor signal value $DS_n$ are read out. The road sensor signal values $DS_n$ are read in sequence starting with the first and are replaced with the next one each time the road surface discriminating steps 3024 to 3030 are performed. The absolute difference $|\overline{L_n} - DS_n|$ between the reference value $\overline{L_n}$ and the corresponding road sensor signal value $DS_n$ is derived and compared with the threshold value $V_0$ stored in the temporary register 328, at a step 3024. If the absolute value is equal to or greater than the threshold value, then the counter CNT is incremented by 1, at a step 3026. Thereafter, the timer value T is checked at a step 3028 so as to check whether or not a predetermined time has expired. On the other hand, if the absolute value is less than the threshold value, then the step 3026 is skipped and control goes directly to the step 3028.

Until the timer value T reaches a given value representative of the predetermined period of time, the steps 3022 to 3028 are repeated. Therefore, if time has not expired when checked at the step 3028, control returns to the step 3022. During this operation, the memory block which is to be accessed to retrieve the next road sensor signal value $DS_n$ is updated with the block $R_{DSn+1}$, at a step 3030. Therefore, in the next cycle of operation, the road sensor value $R_{DSn+1}$ would be read out.

The aforementioned loop of the steps 3022 to 3030 is repeated for the predetermined period of time, e.g. 1 sec.

When time is up when checked at the step 3028, then the counter value CNT is compared with a predetermined value M at a step 3032. The predetermined value M is a threshold between smooth and rough road surfaces. Therefore, when the counter value CNT is equal to or greater than the predetermined value M, then the road surface on which the vehicle is travelling is judged to be rough and otherwise, the vehicle is judged to be on a smooth road surface. When a rough road surface is detected by comparison of the counter value CNT with the predetermined value M, then actuator 60 is deenergized, which engenders the LOW torsion modulus of the stabilizer 30, at a step 3034. At the same time, the flag FH in the flag register 316 is reset. On the other hand, is a smooth road surface is detected at the step 3032, the actuator 60 is energized to enforce the HIGH torsion modulus of the stabilizer at a step 3036. After one of the steps 3034 and 3036, the program ends.

FIG. 20 shows a modification of the road sensor utilized in the aforementioned second embodiment of the torsion modulus control system for the roll stabilizer according to the present invention. In this modification, the road sensor 80 generally comprises a piezoelectric element 82. The piezoelectric element 82 is sandwiched between an upper spring seat 84 seating the upper end of the suspension coil 86 and a fitting bracket 88 through which the strut assembly 90 of the suspension is fixed to the vehicle body. The piezoelectric element 82 is fitted around a piston rod 92 of a shock absorber 94.

The piezoelectric element 82 produces an analog signal having a value which varies depending upon the amplitude of vibrations transmitted through the shock absorber and the piston rod thereof. The analog signal produced by the piezoelectric element should correspond to the analog signal produced by the stroke potentiometer of the second embodiment.

It should be noted that, in the shown second embodiment, the torsion modulus of the stabilizer is determined depending only on the road surface conditions as detected by the road sensor, however, it is possible to employed the same procedure as explained with respect to the first embodiment with reference to FIG. 7. In addition, although specific embodiments which binarily adjust the torsion modulus of the stabilizer between discreet LOW and HIGH values have been disclosed for better understanding of the invention, it is also possible for the torsion modulus to vary continuously depending upon selected suspension control parameters. Furthermore, the specific parameters employed in the shown embodiments should be understood to be mere examples and can be replaced with any suitable parameters.

What is claimed is:

1. An automotive vehicle suspension system comprising:
   first means for rotatably supporting a pair of vehicle wheels and for supporting a vehicle body;
   a roll stabilizer connected to said first means and extending perpendicular to the longtudinal axis of the vehicle, said stabilizer producing a damping force against rolling moment applied to said first means, said stabilizer including second means for adjusting torsion modulus of the stabilizer to adjust the damping force produced;

an actuator associated with said second means for operating said second means to adjust the torsion modulus of the stabilizer;

a detector adapted to detect a preselected vehicle driving condition-indicative parameter and produce a detector signal indicative thereof; and a controller including means responsive to the detector signals for deriving a smooth or rough road condition indicative signal on the bases of the detector signals relative to a predetermined road roughness, and means responsive to the road condition indicative signal for providing a control signal indicative of the road condition to said actuator to activate the latter so as to adjust the torsion modulus of said stabilizer and the damping force produced thereby at least between a higher and a lower value responsive to the smooth or rough road condition indicative signal, respectively;

said stabilizer comprising a first torsion bar segment associated with a first portion of said first means near one of said vehicle wheels and a second torsion bar segment associated with a second portion of said first means near a second vehicle wheel, and said second means comprising a connector tube to which the proximal ends of said first and second segments are connected, said connector tube being filled with a magnetic fluid in which the concentration of ferromagnetic material included therein is subject to adjustable spacial gradients according to external magnetic fields, which in turn influences the torsion modulus of the stabilizer, and said actuator comprising third means for producing a magnetic field with an adjustable field strength around said connector tube, which field strength is determined by said control signal.

2. The suspension system as set forth in claim 1, wherein said third means comprises a magnetic coil energized to an extent corresponding to the control signal value.

3. The suspension system as set forth in claim 1, wherein said magnetic fluid is a coloidal mixture of powdered ferromagnetic material coated with surface-active agent and dispersed in a solvent.

4. The suspension system as set forth in claim 3, wherein said ferromagnetic material is chosen from among magnetite, mangano-ferrite, nickel ferrite and the like.

5. The suspension system as set forth in claim 4, wherein said ferromagnetic material has a grain size of approximately 100 to 200 Angstrom.

6. The suspension system as set forth in claim 3, wherein said surface-active agent is a linear unsaturated fatty acid.

7. The suspension system as set forth in claim 6, wherein said linear unsaturated fatty acid is chosen from among oleic acid, linolenic acid and the like.

8. The suspension system as set forth in claim 3, wherein said solvent is chosen from aliphatic hydrocarbon, aromatic hydrocarbon, and water.

9. The suspension system as set forth in claim 8, said solvent is includes at least one of an anionic detergent, nonionic detergent and the like.

10. The suspension system as set forth in claim 1, wherein said actuator operates in an on/off manner and said control signal supplied to said actuator by said controller is a binary signal so that in response to a high-level control signal, the torsion modulus is adjusted to the first higher level, and in response to a low-level control signal, the torsion modulus is adjusted to the second lower level.

11. The suspension system as set forth in claim 10, wherein said detector detects road surface conditions, and said controller produces a high-level control signal when a relatively smooth road surface condition is detected and the low level control signal when a rough road surface is detected.

12. The suspension system as set forth in claim 11, which further comprises a steering sensor detecting angular steering adjustments, and said controller holds the control signal level low even when the road conditions detected by the detector change from rough road conditions to smooth road conditions, until after a given period of time throughout which angular steering adjustments remain smaller than a given amplitude.

13. An automotive vehicle suspension system comprising:

first means for rotatably supporting a pair of vehicle wheels and for supporting a vehicle body;

a roll stabilizer connected to said first means and extending perpendicular to the longitudinal axis of the vehicle, said stabilizer producing a damping force against rolling moment applied to said first means, said stabilizer including second means for adjusting the torsion modulus of the stabilizer to adjust the damping force produced;

an actuator associated with said second means for operating said second means to adjust the torsion modulus of the stabilizer;

road condition detecting means including a road sensor utilizing ultrasonic waves to measure the distance between the road surface and the vehicle body for detecting road surface conditions and for producing signals indicative of the measured distance;

a controller including means:

for periodically sampling the detector signals indicative of the measured distance between vehicle body and road surface and producing sampled distance values;

for averaging the sampled distance values to derive an average value;

for comparing the average value with each of said sampled distance values to derive difference therebetween;

for counting the number of differences greater than a given reference value;

for comparing the counted number with a given threshold and providing a road condition indicative signal representing that the vehicle is on a relatively smooth road surface when the counted number is less than said threshold; and responsive to the road condition indicative signal for deriving a desired value of the torsion modulus to be produced by said stabilizer and feeding a control signal indicative of the derived value of the torsion modulus to said actuator to activate the latter so as to adjust the damping force to be produced by the stabilizer.

14. The suspension system as set forth in claim 13, wherein said controller controls the actuator to adjust the torsion modulus of the stabilizer to a first higher value when said counted number is less than the given threshold and to a second, lower value when the counted number is equal to or greater than said given threshold.

15. The suspension system as set forth in claim 13, wherein said stabilizer comprises a pair of axially extending segments of essentially rectangular cross-section connected to opposite ends of said first means, the other ends of said axially extending segments being rotatably connected to a transverse segment of said stabilizer and associated with said actuator, and said actuator causing rotational movement of the axially extending segments through 90° so as to adjust the torsion modulus of the stabilizer.

16. The suspension system as set forth in claim 15, wherein said actuator is operative between a first position in which the torsion modulus of the stabilizer is at a first, higher value, and a second position in which the torsion modulus of the stabilizer is at a second, lower value.

17. The suspension system as set forth in claim 13, wherein said control signal varies binarily between a high level and a low level, wherein a high-level control signal is produced when relatively smooth road surface conditions are judged and a low-level control signal is produced when rough road surface conditions are judged.

18. The suspension system as set forth in claim 17, wherein said actuator is energized in response to said high-level control signal to adjust the torsion modulus of the stabilizer to a high value and deenergized, in response to said low-level control signal to adjust the torsion modulus of the stabilizer to a relatively low value.

19. The suspension system as set forth in claim 13 wherein said reference value is adjusted according to vehicle speed.

20. An automotive vehicle system comprising:
a suspension system interposed between road wheels and a vehicle body and having variable characteristics at least between a softer suspensin mode and a harder suspension mode;
road condition detecting means including a road sensor to measure the distance between the road surface and the vehicle body for detecting road surface conditions and for producing signals indicative of the measured distance; and
controller means associated with said suspension system for controlling suspension characteristics thereof, depending upon roughness of the road surface, at least between said softer suspension mode and said harder suspension mode, said controller means including means for periodically sampling the detector signals indicative of the measured distance between vehicle body and road surface and producing sampled distance values, means for averaging the sampled distance values to derive an average value, means for comparing the average value with each of said sampled distance values to derive a difference therebetween, means for counting the number of differences greater than a given reference value, means for comparing the counter number with a given threshold and providing a road roughness indicative signal representing that the vehicle is on a relatively smooth road surface when the counted number is less than said threshold; said controller means being responsive to the roughness indicative signal for operating said suspension system in the harder suspension mode.

21. An automotive vehicle suspension system comprising:
a suspension system interposed between road wheels and a vehicle body and having variable suspension characteristics;
road condition detecting means including a road sensor to measure the distance between the road surface and the vehicle body for detecting road surface conditions and for producing signals indicative of the measured distance; and
a controller means associated with said suspension system for controling suspension characteristics thereof, depending upon the roughness of the road surface, at least between a softer suspension mode and a harder suspension mode, said controller means including means for periodically sampling the detector signals indicative of the measured distance between vehicle body and road surface and producing sampled distance values, means for averaging the sampled distance values to derive an average value, means for comparing the average value with each of said sampled distance values to derive a difference therebetween, means for counting the number of differences greater than a given reference value, means for comparing the counter number with a given threshold and providing a road roughness indicative signal representing that the vehicle is on a relatively rough road surface when the counted number is greater than said threshold; said controller means being responsive to the roughness indicative signal for operating said suspension system in the softer suspension mode.

22. The suspension system as set forth in claim 20, wherein said road sensor utilizes ultrasonic waves to measure the distance between the road surface and the vehicle body.

23. The suspension system as set forth in claim 20, wherein said detector comprises a stroke sensor associated with a piston of a shock absorber of the suspension system for measuring the movement of the piston, said stroke sensor producing a sensor signal indicative of the detected piston movement.

* * * * *